US011572496B2

(12) United States Patent
Fripp et al.

(10) Patent No.: US 11,572,496 B2
(45) Date of Patent: Feb. 7, 2023

(54) EXPANDABLE METAL SLURRY FOR WELLBORE ISOLATION AND SEALING

(71) Applicant: Halliburton Energy Services, Inc., Houston, TX (US)

(72) Inventors: Michael Linley Fripp, Carrollton, TX (US); Paul Joseph Jones, Houston, TX (US); Stephen Michael Greci, Little Elm, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/120,946

(22) Filed: Dec. 14, 2020

(65) Prior Publication Data

US 2022/0186104 A1 Jun. 16, 2022

(51) Int. Cl.
*C09K 8/48* (2006.01)
*E21B 33/14* (2006.01)
*C09K 8/42* (2006.01)

(52) U.S. Cl.
CPC ............... *C09K 8/48* (2013.01); *C09K 8/426* (2013.01); *E21B 33/14* (2013.01)

(58) Field of Classification Search
CPC .................................................. C09K 8/473
See application file for complete search history.

(56) References Cited

U.S. PATENT DOCUMENTS

| 4,565,578 | A | 1/1986 | Sutton et al. |
| 7,473,313 | B2 | 1/2009 | Santra et al. |
| 10,316,601 | B2 | 6/2019 | Walton et al. |
| 2006/0124304 | A1 | 6/2006 | Bloess et al. |
| 2007/0277979 | A1 | 12/2007 | Todd et al. |
| 2007/0284011 | A1 | 12/2007 | Freyer et al. |
| 2015/0252245 | A1* | 9/2015 | James ............ C09K 8/5083 507/221 |
| 2019/0048250 | A1 | 2/2019 | Droger et al. |

FOREIGN PATENT DOCUMENTS

| WO | 2005022012 | 3/2005 |
| WO | 2018094352 | 5/2018 |
| WO | 2019147285 | 8/2019 |

OTHER PUBLICATIONS

PCT Application No. PCT/US2020/066042, International Search Report and Written Opinion, dated Aug. 30, 2021, 11 pages.

* cited by examiner

*Primary Examiner* — William D Hutton, Jr.
*Assistant Examiner* — Avi T Skaist
(74) *Attorney, Agent, or Firm* — Kilpatrick Townsend & Stockton LLP

(57) ABSTRACT

A method includes providing an expandable metal slurry downhole in a wellbore. The expandable metal slurry includes granules of an expandable metal material suspended or dispersed in a fluid. Further, the method includes positioning the expandable metal slurry within the wellbore such that the granules of the expandable metal material in the expandable metal slurry are activatable to expand and form a seal within the wellbore.

17 Claims, 9 Drawing Sheets

EXPANDABLE METAL SLURRY FOR WELLBORE ISOLATION AND SEALING

TECHNICAL FIELD

The present disclosure relates generally to oilfield operations and, more particularly, although not necessarily exclusively, to an expandable metal slurry used within a wellbore in an oilfield operation for zonal isolation and wellbore component sealing.

BACKGROUND

During completion of a wellbore, casing may be added to the wellbore and cemented to seal and fix the casing in the wellbore. Additionally, isolation elements may be added to the wellbore using cement to isolate portions of the wellbore. Cementing and isolation operations may be time intensive operations due to an overall curing time of the cement. Further, because cement begins to cure immediately upon mixing the cement, the cementing and isolation operations must proceed toward completion immediately upon mixing the cement at a surface of the wellbore. Thus, unexpected delays in the cementing and isolation operations may result in lost material used in the operations or defective cementing and isolation results.

DETAILED DESCRIPTION

Figure 1:
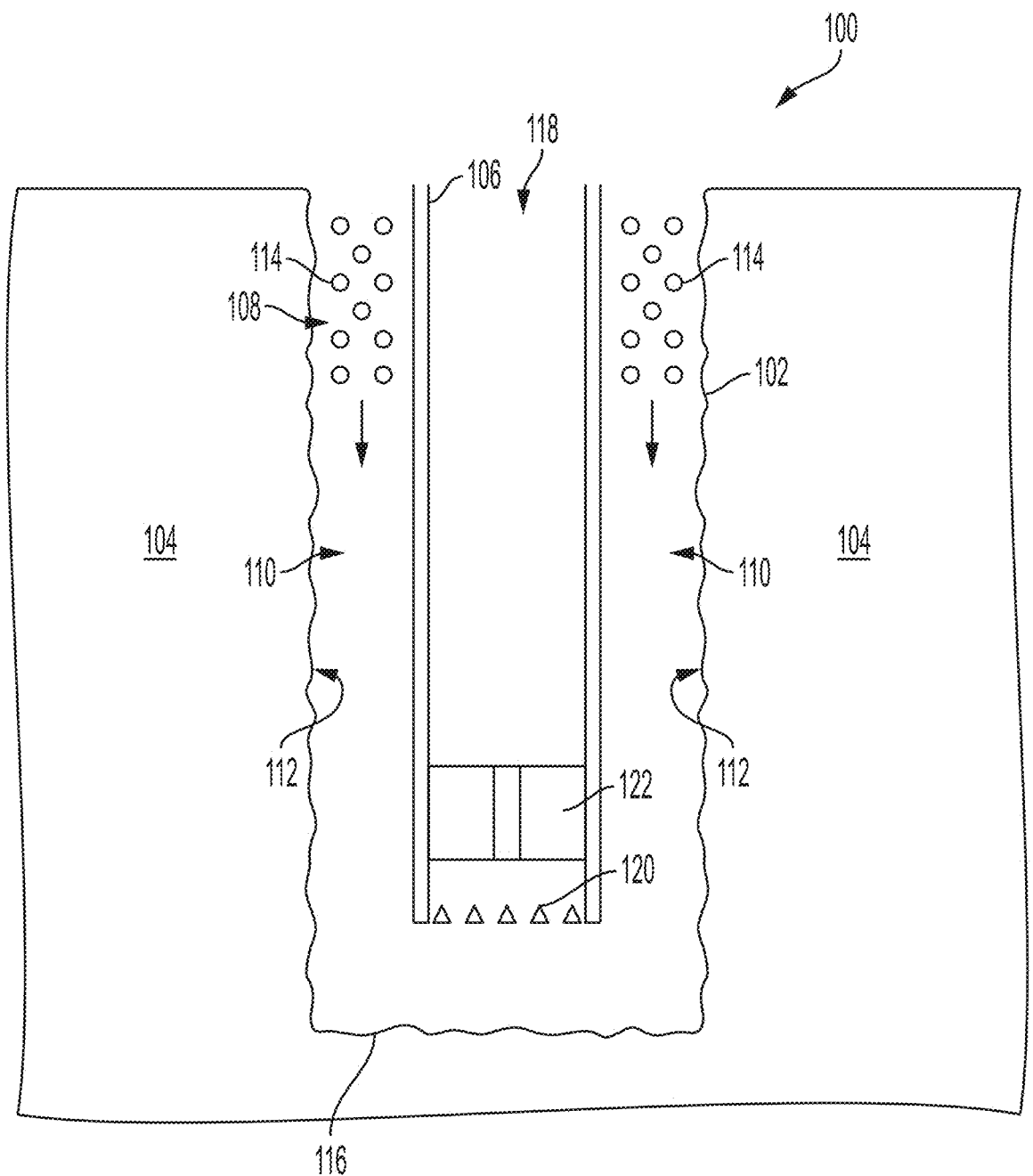
FIG. 1 is a schematic illustration depicting a wellbore completion environment according to one example of the present disclosure.

Certain aspects and examples of the present disclosure relate to an expandable metal slurry used for wellbore isolation and sealing. In some examples, expandable metal within the expandable metal slurry may be a metal that chemically reacts with wellbore fluids to form a metal hydroxide. A volume of the resulting metal hydroxide may be substantially larger than a volume of the original expandable metal in the expandable metal slurry. Accordingly, the expandable metal expands in volume as the expandable metal hydrates to form the metal hydroxide. The metal hydroxide may be used within the wellbore to create a pressure seal within the wellbore.

The expandable metal of the expandable metal slurry may include magnesium, aluminum, zinc, or a combination thereof. In some examples, the expandable metal may be alloyed to alter the reaction rate. For example, an alloy of magnesium, aluminum, or zinc may increase or decrease the reaction rate of the expandable metal.

In an example, the expandable metal slurry may be used in to seal a portion of casing within the wellbore. For example, the expandable metal slurry may be circulated into the wellbore in an annulus between the casing and a wall of the wellbore or another section of tubing. Expandable metal granules within the expandable metal slurry may concentrate at a shoe of the casing. In an example, the shoe of the casing includes a screen that allows wellbore fluid to pass, but the screen collects the expandable metal granules. Collecting the expandable metal granules at the screen results in the concentration of the expandable metal granules at the shoe of the casing.

In another example, the expandable metal slurry may be circulated into the wellbore within the casing. Collection of the expandable metal granules at the screen within the casing may form a plug within the casing. A location of the screen within the wellbore can be adjusted prior to pumping the expandable metal slurry into the wellbore to provide an accurate placement of the plug.

When the expandable metal granules are in place at the shoe or other location in the wellbore, a water-based solution may be injected into the annulus to wash away an oil-based fluid included in the expandable metal slurry. Upon removal of the oil-based fluid, the expandable metal granules begin to react with the water-based solution to expand into a hard seal at the shoe of the casing.

In an additional example, the expandable metal slurry may be used in a gravel-pack isolation operation. In such an operation, the expandable metal slurry may be sequenced with non-reactive granules, such as proppant, for installation around a gravel-pack screen within the wellbore. By sequencing the expandable metal slurry with the non-reactive granules, zonal isolation may be established along a length of the gravel-pack screen.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic illustration depicting a wellbore completion environment 100 according to one example of the present disclosure. A wellbore 102 can extend through various earth strata and can extend through or to a hydrocarbon bearing subterranean formation 104. Although the wellbore 102 is depicted in FIG. 1 as substantially vertical, other orientations for sections of the wellbore 102 can be used, including curved, angled, or substantially horizontal. The wellbore 102 may include a casing string 106. An expandable metal slurry 108 may be used to fix the casing string 106 in place within the wellbore 102 as part of a completion operation. As illustrated, the expandable metal slurry 108 is directed downhole within an annulus 110 between a wall 112 of the wellbore 102 and the casing string 106.

The expandable metal slurry 108 can include a wellbore treatment fluid with expandable metal granules 114. The expandable metal granules 114 may be suspended or dispersed within the wellbore treatment fluid. In an example, the expandable metal granules 114 may be coated with a layer that delays activation of the expandable metal granules 114 within the wellbore 102, as discussed in greater detail below with respect to FIG. 4.

The wellbore treatment fluid may include diesel, an oil-based mud, or other non-aqueous fluid (NAF). The diesel, oil-based mud, or other NAF wellbore treatment fluid may not react with the expandable metal granules 114. After the expandable metal granules 114 are positioned at a downhole end 116 of the wellbore 102, the diesel or oil-based mud may be flushed with a water-based wellbore fluid. The water-based wellbore fluid, such as a brine, may react with the expandable metal granules 114 to form a metal hydroxide. The high surface area to volume ratio of the expandable metal granules 114 may encourage a rapid reaction, and a seal between the casing string 106 and the wall 112 of the wellbore 102 may form quickly. The resulting seal may be a pressure seal or anchor for the casing string 106.

In the illustrated example, the expandable metal slurry 108 is used in a reverse flow application. That is, the expandable metal slurry 108 enters the wellbore 102 in the annulus 110 rather than through an inner-diameter 118 of the casing string 106. A screen 120 may be positioned at a downhole end of the casing string 106. The screen 120 may have openings that are large enough to enable a flow of the wellbore treatment fluid from the annulus 110 into the inner-diameter 118 of the casing string 106 and also small enough to prevent a flow of the expandable metal granules 114 into the inner-diameter 118 of the casing string 106. In an example, a float collar 122 may be used to prevent a flowback of reactive fluid, for example, from the inner-diameter 118 of the casing string 106 to the annulus 110. The flowback of the reactive fluid, such as water-based wellbore fluid, may result in a premature reaction of the expandable metal granules 114 to form a metal hydroxide. Thus, the float collar 122 may provide some protection against such a premature reaction that forms the metal hydroxide.

During a setting or swelling process of the expandable metal granules 114, the expandable metal granules 114 may lock together to form a rigid structure that is able to seal zones within the wellbore. In an example, the rigid structure may be formed by a hydration reaction of the expandable metal material of the expandable metal granules 114. The reaction may result from exposure of the expandable metal material of the expandable metal granules 114 to chemicals within the wellbore that may cause the expandable metal material to form a long-term seal.

The expandable metal material of the expandable metal granules 114 may swell by undergoing hydration reactions in the presence of brines to form metal hydroxides. The metal hydroxide may occupy more space than the base metal reactant. This expansion in volume may allow the expandable metal material to form the long-term seal at the interface of the expandable metal material and any adjacent surfaces. For example, a mole of magnesium has a molar mass of 24 g/mol and a density of 1.74 g/cm$^3$ which results in a volume of 13.8 cm/mol. Magnesium hydroxide has a molar mass of 60 g/mol and a density of 2.34 g/cm$^3$ which results in a volume of 25.6 cm/mol. 25.6 cm/mol is 85% more volume than 13.8 cm/mol. As another example, a mole of aluminum has a molar mass of 27 g/mol and a density of 2.7 g/cm$^3$ which results in a volume of 10.0 cm/mol. Aluminum hydroxide has a molar mass of 63 g/mol and a density of 2.42 g/cm$^3$ which results in a volume of 26 cm/mol. 26 cm/mol is 160% more volume than 10 cm/mol.

The expandable metal material may include any metal or metal alloy that undergoes a hydration reaction to form a metal hydroxide of greater volume than the base metal or metal alloy reactant. Examples of suitable metals for the expandable metal material include, but are not limited to, magnesium, aluminum, tin, zinc, beryllium, barium, manganese, or any combination thereof. Examples of suitable metal alloys for the expandable metal material may include, but are not limited to, any alloys of magnesium, aluminum, tin, zinc, beryllium, barium, manganese, or any combination thereof. Specific examples of the metal alloys can include magnesium-zinc, magnesium-aluminum, or aluminum-copper.

In some examples, the metal alloys may include alloyed elements that are not metallic. Examples of these nonmetallic elements include, but are not limited to, graphite, carbon, silicon, boron nitride, and the like. In some examples, the metal may be alloyed to increase reactivity or to control the formation of oxides. In some examples, the metal alloy may be alloyed with a dopant metal that promotes corrosion or inhibits passivation and thus increases hydroxide formation. Examples of dopant metals include, but are not limited to nickel, iron, copper, carbon, titanium, gallium, mercury, cobalt, iridium, gold, palladium, or any combination thereof.

In an example, the expandable metal granules 114 may be formed by powder metallurgy, solid solution process, forging, or extrusion. As used herein, the term "solid solution" may refer to an alloy that is formed from a single melt in which the components in the alloy, such as a magnesium alloy, are melted together in a casting. The casting can be subsequently extruded, wrought, hipped, machined, ground, or worked to form a desired shape for the expandable metal granules 114. In an example, the expandable metal granules 114 may be uniform in size. In another example, the expandable metal granules 114 may vary in size. For example, the expandable metal granules 114 may have a surface area of between 0.05 and 100 m$^2$/kg. In another example, the expandable metal granules 114 may have a surface area between 0.1 and 20 m$^2$/kg.

In some examples, the expandable metal material of the expandable metal granules 114 may include an oxide. Examples of metal oxides include oxides of any metals disclosed herein, including, but not limited to, magnesium, aluminum, iron, nickel, copper, chromium, tin, zinc, lead, beryllium, barium, gallium, indium, bismuth, titanium, manganese, cobalt, or any combination thereof. The selected expandable metal material may be selected such that the formed sealing element does not degrade into the brine. As such, the use of metals or metal alloys for the expandable metal material that form relatively water-insoluble hydration products may be preferred. For example, magnesium hydroxide has a low solubility in water.

In an example, the brine used to form the metal hydroxides within the wellbore may be saltwater (e.g., water containing one or more salts dissolved therein), saturated saltwater (e.g., saltwater produced from a subterranean formation), seawater, fresh water, or any combination thereof. Generally, the brine may be from any source. The brine may be a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. Additionally, transition metal halides may be used in heavy-weight brines. The transition metal halides may include ferrous chloride, zinc bromide, zinc chloride, and the like. In some examples, the salinity of the brine may exceed 10%.

Although FIG. 1 shows a single casing string 106, multiple casing strings can be used within the wellbore 102, such as a surface casing string, an intermediate casing string, or a production casing string. In an example, a liner suspended from inside the bottom of another casing string may be used.

Figure 2:
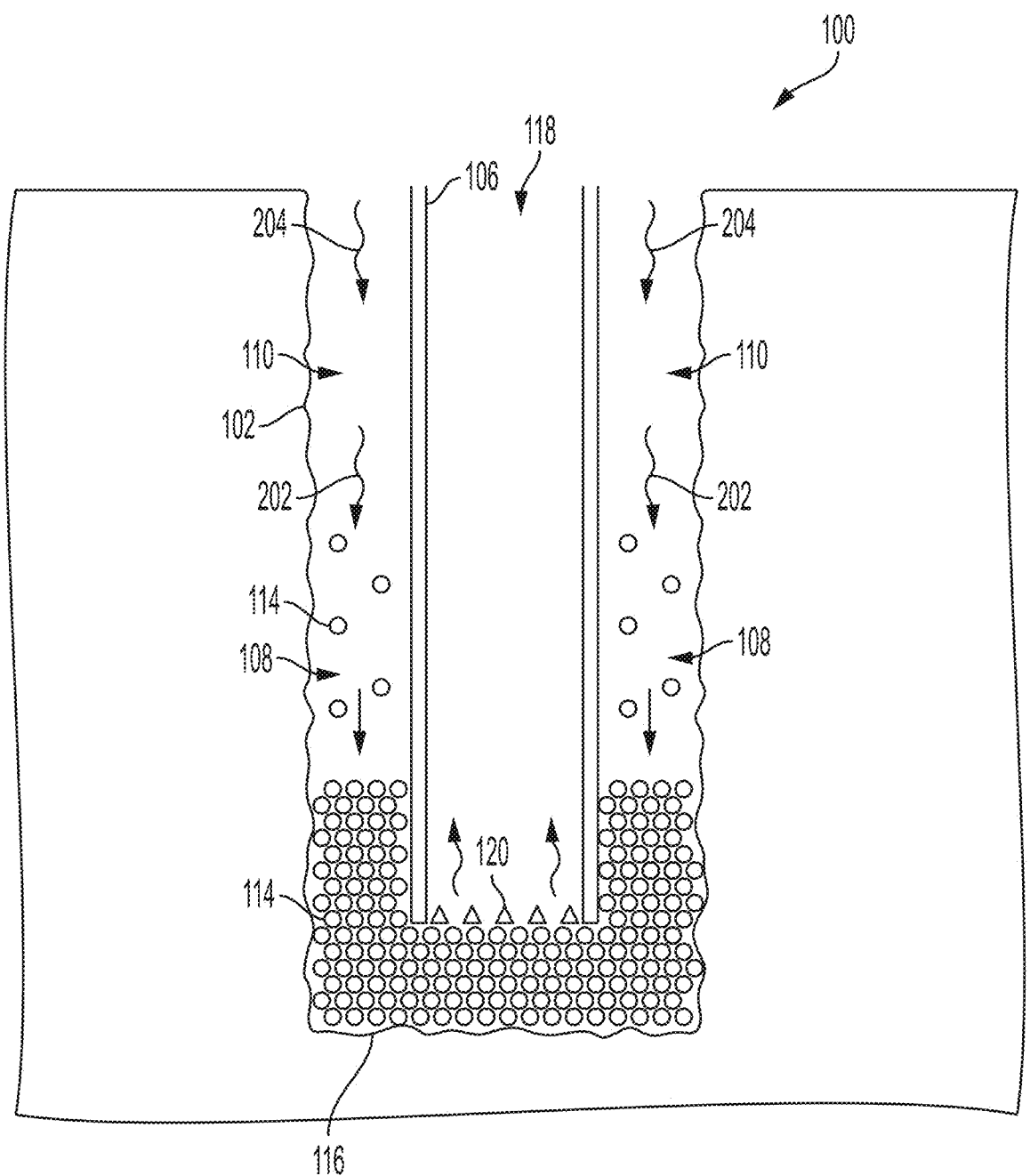
FIG. 2 is a schematic illustration depicting the wellbore completion environment of FIG. 1 after an expandable metal slurry is deposited at a downhole end of a wellbore according to one example of the present disclosure.

FIG. 2 is a schematic illustration depicting the wellbore completion environment 100 after the expandable metal slurry 108 is deposited at the downhole end 116 of the wellbore 102 according to one example of the present disclosure. As the expandable metal slurry 108 reaches the screen 120 positioned at a bottom of the casing string 106, the wellbore treatment fluid may pass through the screen 120 into the inner-diameter 118 of the casing string 106, while the expandable metal granules 114 are collected at the screen 120. Collection of the expandable metal granules 114 at the screen 120 may concentrate the expandable metal granules 114 at the downhole end 116 of the wellbore 102. For example, a concentration of the expandable metal granules 114 in the expandable metal slurry 108 when injected into the wellbore 102 may be half the concentration of the expandable metal granules 114 in the expandable metal slurry 108 when collected at the screen 120. In an additional example, the concentration of the expandable metal granules 114 during injection of the expandable metal slurry 108 can be 1% to 35% by volume. After placement of the expandable metal granules 114 at the screen 120, the concentration of the expandable metal granules 114 can be 20% to 70% by volume.

Once a sufficient amount of the expandable metal granules 114 are positioned downhole within the wellbore 102, a spacer fluid 202 may be introduced into the annulus 110. The spacer fluid 202 may be a viscous fluid that aids in removal of wellbore fluids from the wellbore 102. In an example, the spacer fluid 202 may include a surfactant to prevent gelling of the oil-based fluid of the expandable metal slurry 108.

A water-based wellbore fluid 204 may follow the spacer fluid 202 into the annulus 110. The water-based wellbore fluid 204 may include a brine, as defined above with respect to FIG. 1. In an example, the water-based wellbore fluid 204 may react with the expandable metal granules 114 to produce a hydration reaction. The hydration reaction may result in the expandable metal granules 114 expanding and hardening into a seal at the downhole end of the wellbore 102.

Figure 3:
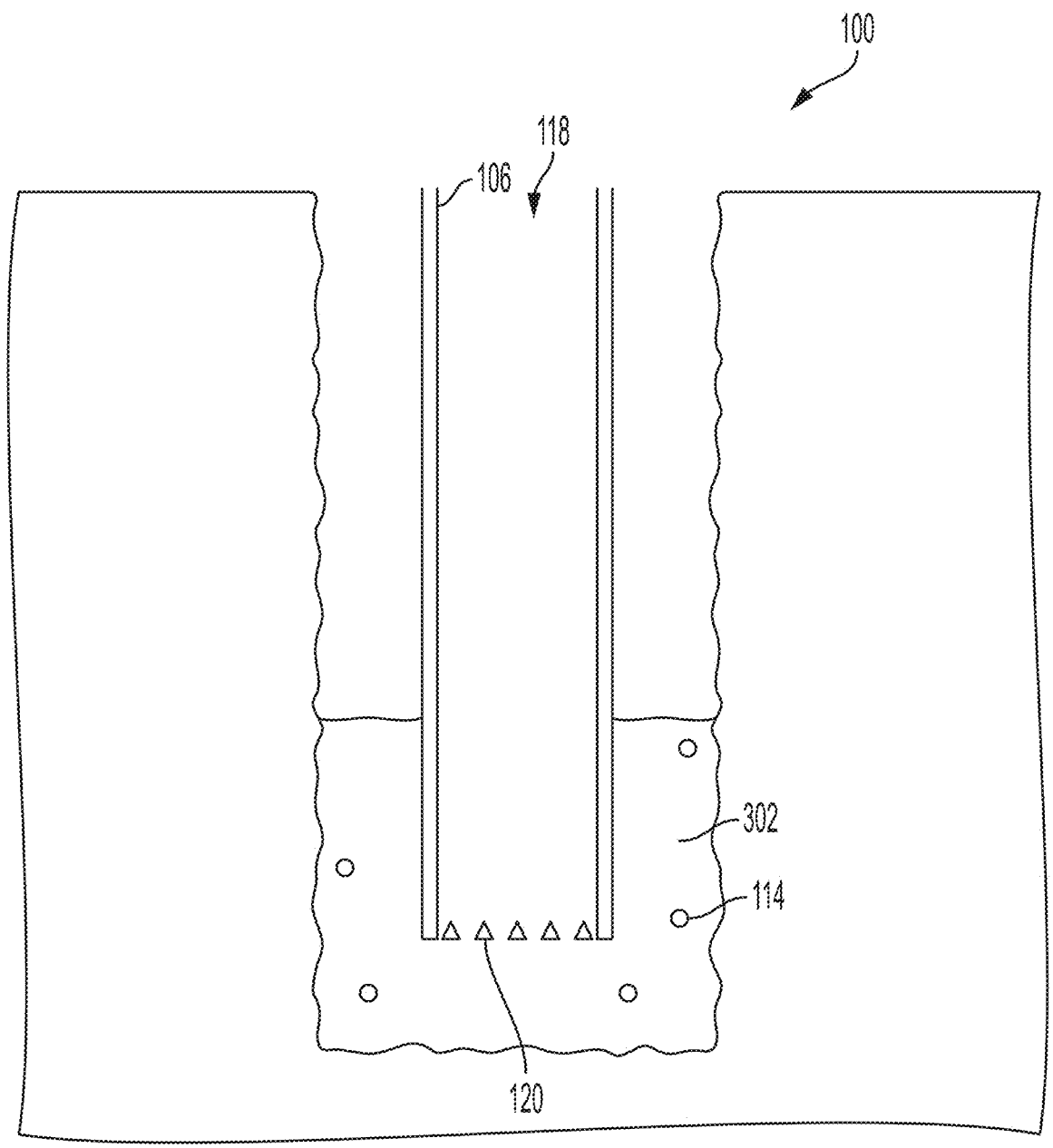
FIG. 3 is a schematic illustration depicting the wellbore completion environment of FIG. 1 after expandable metal granules in the expandable metal slurry are activated according to one example of the present disclosure.

FIG. 3 is a schematic illustration depicting the wellbore completion environment 100 after the expandable metal granules 114 in the expandable metal slurry 108 are activated according to one example of the present disclosure. Because the expandable metal granules 114 react in a hydration chemical reaction, which requires a water-based fluid, the expandable metal granules 114 may remain unreacted while the expandable metal granules 114 are surrounded by the oil-based fluid in the expandable metal slurry 108, such as in FIGS. 1 and 2. Once the oil-based fluid is flushed by the spacer fluid 202 and the water-based wellbore fluid 204, the hydration chemical reaction of the remaining expandable metal granules 114 may commence. For example, the brine of the water-based wellbore fluid 204 may enable the expandable metal granules 114 to hydrolyze and from a seal 302. In some examples, the expandable metal granules 114 may be used to form seals such as a shoe seal, a liner seal, a plug, a kickoff plug, a casing collar, a gravel-pack zonal isolation seal, a bridge plug, or a casing anchor In an example, the seal 302 may include some expandable metal granules 114 that have not undergone the hydration chemical reaction. These expandable metal granules 114 may result in the seal 302 being self-healing. For example, if the water-based wellbore fluid 204 reaches the expandable metal granules 114 within the seal 302, a subsequent hydration chemical reaction at the expandable metal granules 114 may occur. The subsequent hydration chemical reaction may resolve a crack or leak that resulted in contact between the water-based wellbore fluid 204 and the expandable metal granules 114.

While FIGS. 1-3 describe a technique for positioning the seal 302 using a reverse flow application, the expandable metal granules 114 may also be used for forming seals using other techniques. For example, the screen 120 may be installed in other portions of the casing string 106, and the expandable metal slurry 108 may be injected into the inner-diameter 118 of the casing string 106. The expandable metal granules 114 may accumulate uphole from the screen 120, and a water-base fluid may be injected within the inner-diameter of the casing string 106. The water-based fluid may react with the expandable metal granules 114 to form a plug within the inner-diameter 118 of the casing string 106. In an example, the plug may be installed within the wellbore 102 during an abandonment operation of the wellbore 102. For example, when the screen 120 is placed downhole from perforations or a section milled window within the wellbore 102, the plug may be useful for a permanent abandonment operation of the wellbore 102.

Figure 4:
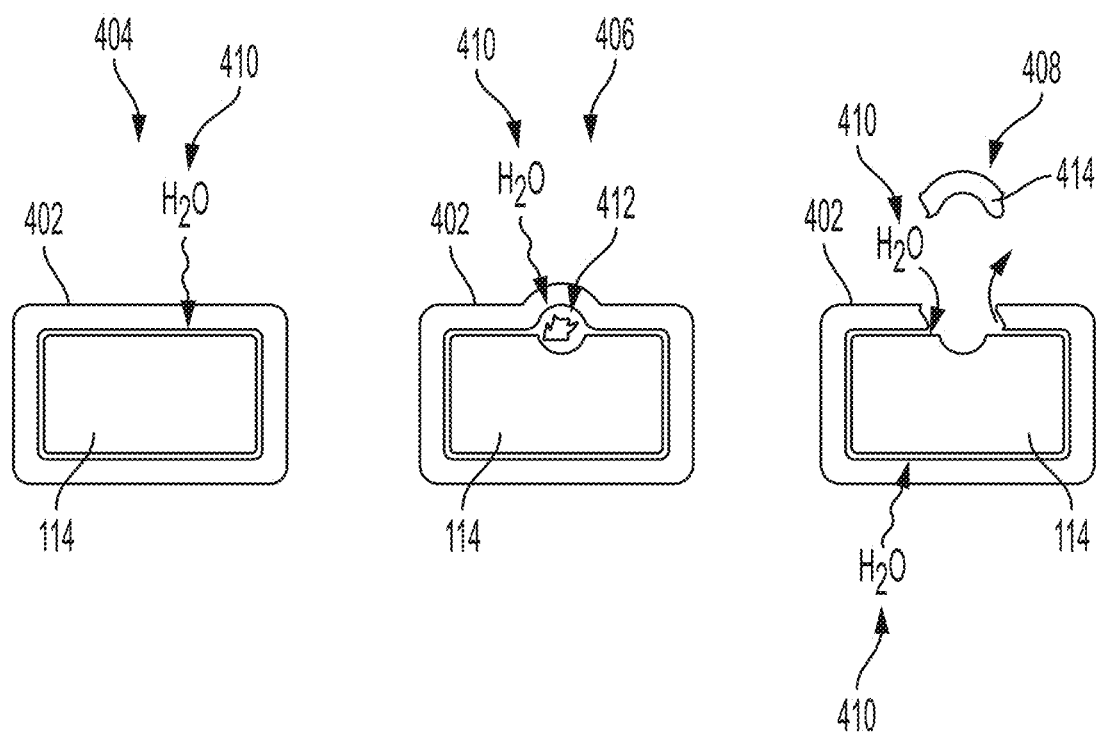
FIG. 4 is a schematic illustration of an expandable metal granule with a coating that delays a chemical reaction of the expandable metal according to one example of the present disclosure.

FIG. 4 is a schematic illustration of an expandable metal granule 114 with a coating 402 that delays the hydration chemical reaction of the expandable metal according to one example of the present disclosure. A coated granule 404 in an initial state may include the coating 402 that is completely intact. Because the coating 402 is intact, water 410 is not able to react with the expandable metal granule 114.

A coated granule 406 includes an area 412 where water has made it past a portion of the coating 402. At the area 412, a hydration chemical reaction may occur, which results in expansion of a portion of the expandable metal granule 114. A coated granule 408 depicts a result of the expansion of the portion of the expandable metal granule 114. For example, the expansion of the portion of the expandable metal granule 114 may break off a portion of the coating 402. Because the coating 402 is no longer intact, the water 410 may be able to surround the expandable metal granule 114, which may result in further hydration chemical reactions. This process from the coated granule 404 to the coated granule 408 and beyond may be a typical operation cycle for the expandable metal granule 114 with the coating 402 once positioned within the wellbore 102.

In an example, the coating 402 may be a polymer, a ceramic, an organic material, or a metal. The coating 402 may be an anodizing coating or a plasma electrolytic oxidation (PEO) coating where the coating 402 is formed by oxidizing part of the expandable metal granule 114. In some examples, the coating 402 may be hydrophobic, such as from a grease or a wax. The coating 402 may be a physical vapor deposition or a chemical vapor deposition. Further, the coating 402 may be sprayed, dipped, electrodeposited, wetted, applied with an auto-catalytic reaction, vacuum evaporated from solvent, or applied with any other suitable technique.

The coating 402 may be made from nickel, gold, silver, titanium, chrome, or a fusible alloy, such as nickel-phosphorous or nickel-boron. In an additional example, the coating 402 may be a ceramic coating. The ceramic coating may be an oxide such as zirconium dioxide. Additionally, the coating 402 may be a polymer coating such as rubber, epoxy, plastic, vinyl, polylactide (PLA), polyglycolic acid (PGA), or urethane. The coating 402 may also be an organic coating, such as sorbitan monooleate, glycerin monoricinoleate, sorbitan monoricinoleate, sorbitan monotallate, pentaerythritol monoricinoleate, sorbitan monoisostearate, glycerol monostearate, sorbitan monostearate, and mixtures thereof.

When coated with the coating 402, the expandable metal granule 114 may be smaller in some instances than the expandable metal granules 114 that are uncoated. For example, the expandable metal granules 114 may have a surface area of greater than 250 m$^2$/kg. In an example, the expandable metal granules 114 may have a surface area between 0.05 and 400 m$^2$/kg. Further, because the coating 402 slows the reaction of the expandable metal granules 114, the expandable metal slurry 108 may include a water-based wellbore treatment fluid or an oil-based wellbore treatment fluid.

In an example, coated or uncoated expandable metal granules 114 may be mixed with other particles in the expandable metal slurry 108. For example, the expandable metal granules 114 may be mixed with proppant, elastomers, plastics, ceramics, other metals, or a combination thereof. The other particles may be granules or fibers. In some examples, multiple sizes of the expandable metal granules 114 may be used to provide a more effective packing density. For example, two or more different granule sizes may be used.

Figure 5:
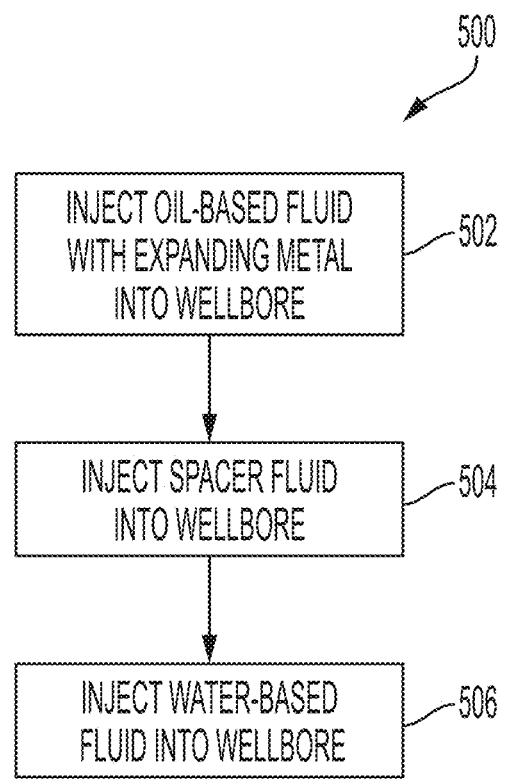
FIG. 5 is a flowchart of a process for activating an expandable metal slurry within a wellbore according to one example of the present disclosure.

FIG. 5 is a flowchart of a process 500 for activating the expandable metal slurry 108 within the wellbore 102 according to one example of the present disclosure. At block 502, the process 500 involves injecting the expandable metal slurry 108 into the annulus 110 between the casing string 106 and the wall 112 of the wellbore 102. In an example, the expandable metal slurry 108 is an oil-based wellbore treatment fluid including the expandable metal granules 114. In an example where the expandable metal granules 114 are coated with the coating 402, the expandable metal slurry 108 may include an oil-based wellbore treatment fluid or a water-based wellbore treatment fluid. In some examples, the expandable metal slurry 108 may include a viscosifier to promote suspension of the expandable metal granules 114 within the expandable metal slurry 108. The viscosifier may be of a sufficient yield to prevent sedimentation of the metal granules 114 within the expandable metal slurry 108. In one or more examples, the spacer fluid 202 may be injected into the wellbore 102 ahead of the expandable metal slurry 108 for wellbore cleaning and surface preparation for bonding of the expandable metal granules 114 upon solidification.

The viscosifier can be any suitable viscosifier. The viscosifier can affect the viscosity of the expandable metal slurry 108 or a solvent that contacts the expandable metal slurry 108 at any suitable time and location. In some embodiments, the viscosifier provides an increased viscosity before injection into the subterranean formation, at the time of injection into the subterranean formation, during travel through a tubular disposed in a borehole, once the expandable metal slurry 108 reaches a particular subterranean location, some period of time after the expandable metal slurry 108 reaches a particular subterranean location, or a combination thereof. In some embodiments, the viscosifier can be about 0.000.1 wt % to about 10 wt % of the expandable metal slurry 108 or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the expandable metal slurry 108 or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), where the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some examples, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_5$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_5$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethyl-pentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_5$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

For an oil suspension of the expandable metal slurry 108, the viscosifier may include an organophilic clay or a synthetic polymer. For a water-based suspension of the expandable metal slurry 108, examples of the viscosifier may include any viscosifier formulated in an optimal amount of polysaccharide biopolymer sub-groups including: scleroglucan; carragenans; xanthan; welan; diutan gums; celluloses; or hydroxyl ethyl celluloses. In an additional example, the viscosifier may include other components such as synthetic polymer viscosifiers. The synthetic polymer viscosifiers may include high molecular weight acrylamide polymers, acrylic acid-acrylamide co-polymers, and acrylamide co-polymers. The suspension additives may be present in any suitable amount, including, but not limited to, an amount of about 0.1 wt % to about 7 wt %. In another example, the suspension additives may be present in an amount from about 0.3 wt % to about 5 wt % or about 0.5 wt % to about 3 wt %.

At block 504, the process 500 involves injecting the spacer fluid 202 into the annulus 110. As with the spacer fluid 202 injected into the wellbore 102 prior to injection of the expandable metal slurry 108, the spacer fluid 202 injected at block 504 may be a viscous fluid that aids in removal of wellbore fluids from the wellbore. In an example, the spacer fluid 202 may include a surfactant to prevent gelling of the oil-based fluid of the expandable metal slurry 108. Preventing gelling of the oil-based fluid may help sweep oils out of a bed of the expandable metal granules 114 that accumulate near the screen 120 at the downhole end 116 of the wellbore 102.

At block 506, the process 500 involves injecting the water-based wellbore fluid 204 into the wellbore 102. The water-based wellbore fluid 204, such as a brine, may be reactive with the expandable metal granules 114. For example, when the expandable metal granules 114 are in contact with the water or brine, the expandable metal granules 114 may undergo a hydration reaction to form a metal hydroxide seal at the downhole end 116 of the wellbore 102.

Figure 6:
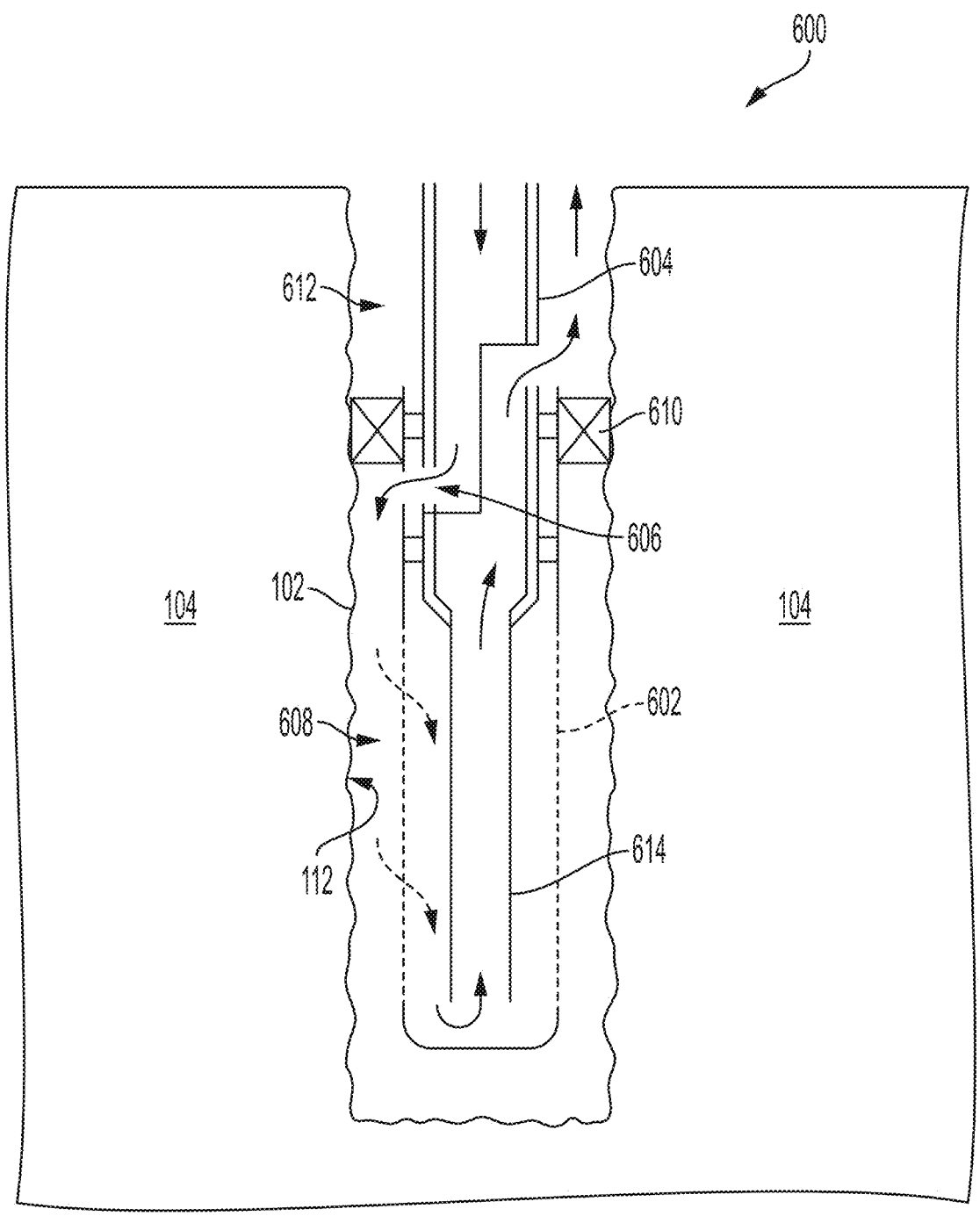
FIG. 6 is a schematic illustration of a gravel-packing environment including a gravel-pack screen according to one example of the present disclosure.

FIG. 6 is a schematic illustration of a gravel-packing environment 600 including a gravel-pack screen 602 according to one example of the present disclosure. In an example, the expandable metal slurry 108 may be used to provide zonal isolation along the gravel-pack screen 602. For example, a service string 604 may provide a conduit for transmission of the expandable metal slurry 108 to a location along the gravel-pack screen 602. A circulating port 606 at a downhole end of the service string 604 enables transmission of the expandable metal slurry 108 into an annulus 608 between the wall 112 of the wellbore 102 and the gravel-pack screen 602. A gravel-pack packer 610 may prevent wellbore fluid from flowing between the annulus 608 and an annulus 612 uphole from the circulating port 606 without first traveling through the gravel-pack screen 602 and uphole through a washpipe 614.

Figure 7:
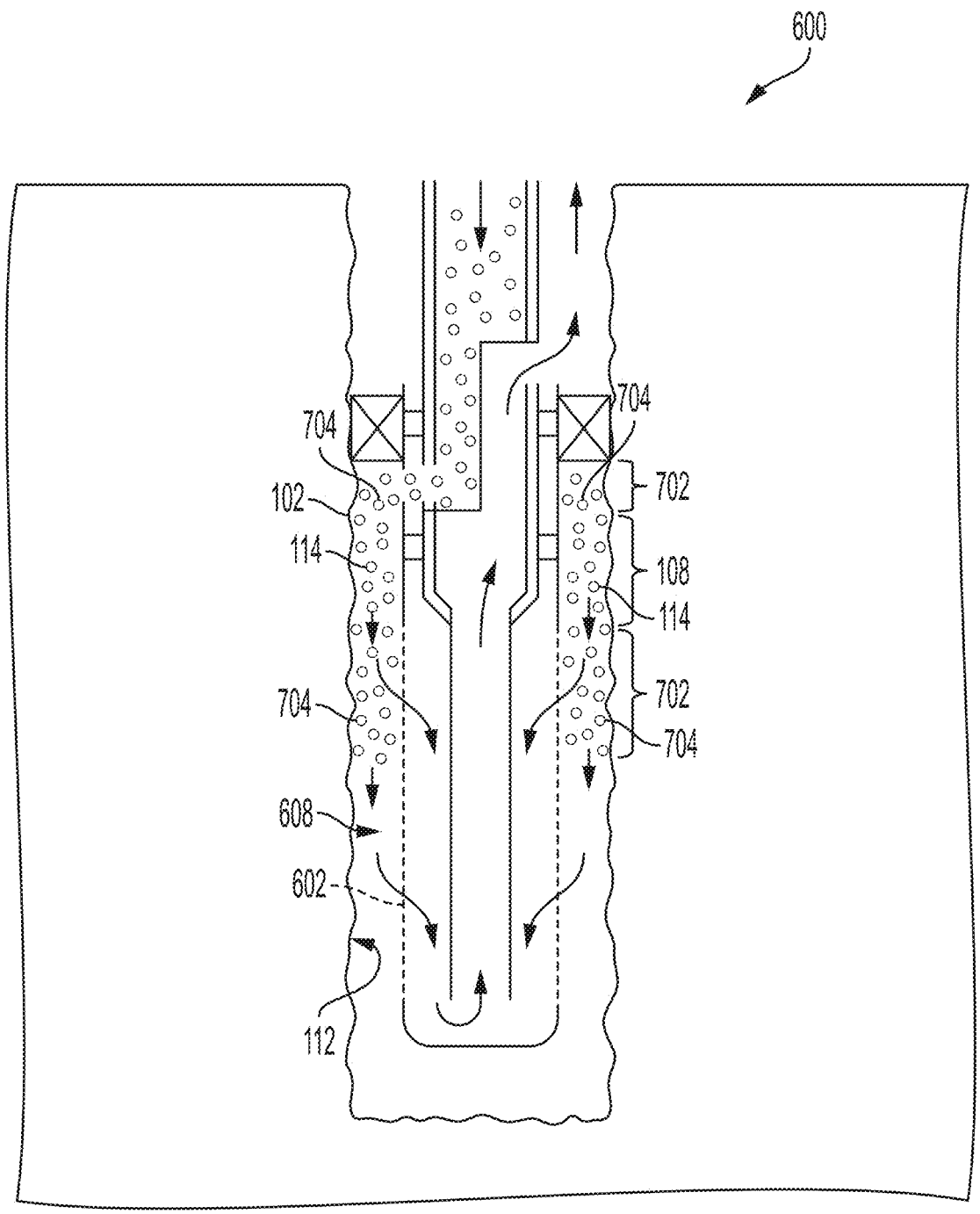
FIG. 7 is a schematic illustration of the gravel-packing environment of FIG. 6 during a gravel-pack zonal isolation operation according to one example of the present disclosure.

FIG. 7 is a schematic illustration of the gravel-packing environment 600 during a gravel-pack zonal isolation operation according to one example of the present disclosure. As shown, material may be layered into the annulus 608 between the wall 112 of the wellbore 102 and the gravel-pack screen 602. For example, a proppant slurry 702 may initially be injected into the annulus 608. The proppant slurry 702 may be a wellbore fluid with a quantity of ceramic proppant 704, such as sand, suspended within the wellbore fluid. After a specified quantity of the proppant slurry 702 is injected into the annulus 608, the expandable metal slurry 108 with the expandable metal granules 114 may be injected into the annulus 608. After a specified quantity of the expandable metal slurry 108 is injected into the annulus 608, another layer of the proppant slurry 702 may be injected into the annulus 608. This sequence may continue until a desired number of isolated zones along a length of the gravel-pack screen 602 is achieved.

Figure 8:
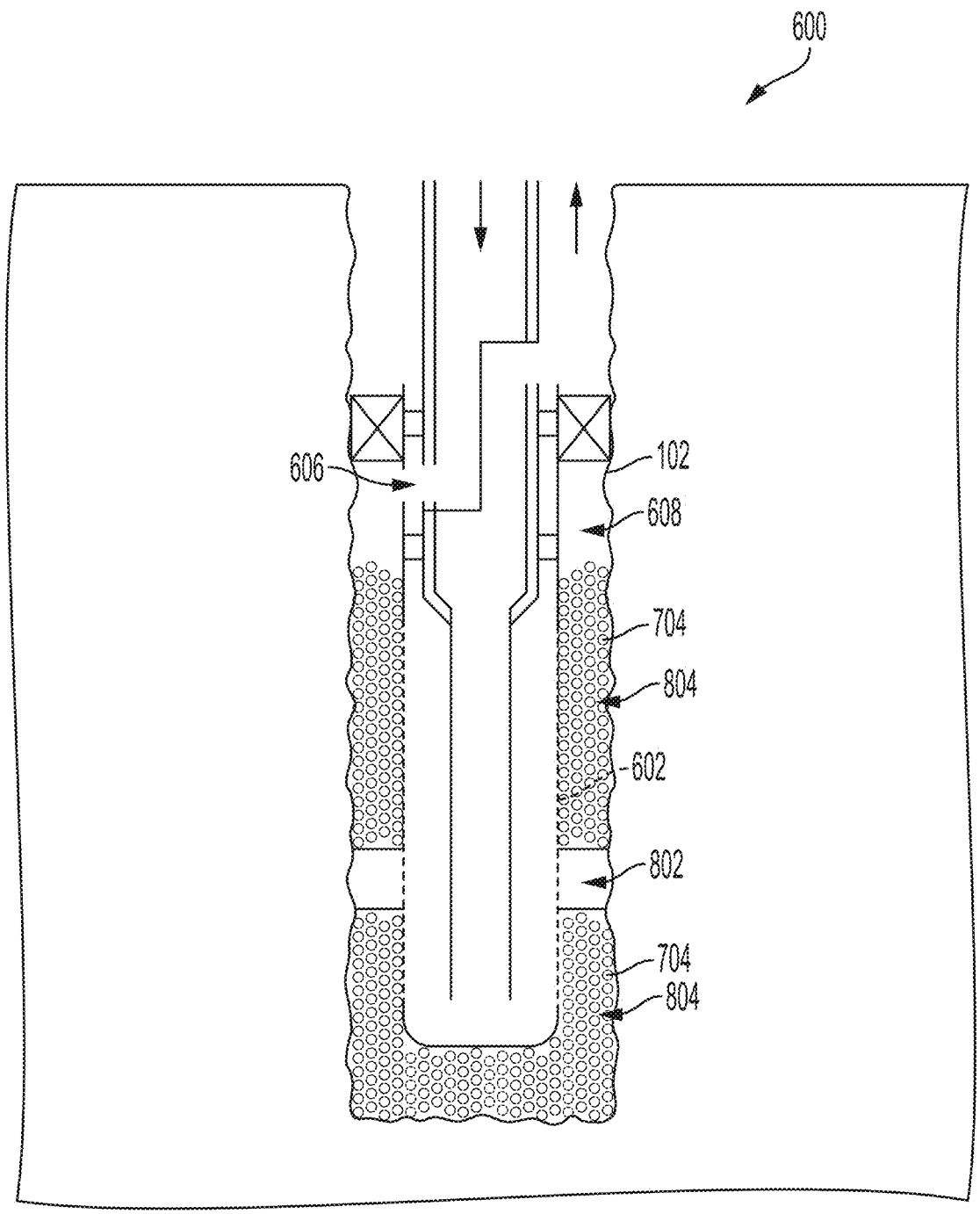
FIG. 8 is a schematic illustration of the gravel-packing environment of FIG. 6 upon completion of a gravel-pack zonal-isolation section according to one example of the present disclosure.

FIG. 8 is a schematic illustration of the gravel-packing environment 100 upon completion of a gravel-pack zonal-isolation section 802 according to one example of the present disclosure. The expandable metal granules 114 of the expandable metal slurry 108 may undergo a hydration reaction and expand to create the zonal isolation 802. Upon completion of the gravel-pack zonal-isolation section 802, there may be sections 804 within the annulus 608 of the wellbore 102 along the gravel-pack screen that are gravel packed in addition to a section of the gravel-pack zonal-isolation section 802. An additional zonal-isolation section 802 may also be established uphole from the most uphole gravel-pack section 804 in case the circulating port 606 does not close or leaks. Although shown as an openhole environment, the annulus 608 may also be within a cased wellbore 102.

In an example, a fluid spacer, such as the fluid spacer 202 described above with respect to FIG. 2, may be injected between the proppant slurry 702 and the expandable metal slurry 108. The fluid spacer may help sweep the proppant 704 into position within the annulus 608 and help to ensure that the expandable metal granules 114 of the expandable metal slurry 108 in FIG. 7 are grouped together in a region that ultimately makes up the zonal-isolation section 802 in FIG. 7. The proppant slurry 702 may be pumped to position in a water-based fluid while the expandable metal granules 114 may be pumped to position in an oil-based fluid. The transition between the water-based fluid and the oil-based fluid may minimize chemical reactions within the expandable metal granules 114 during the pumping phase without also relying on a large quantity of more expensive oil-based fluid for pumping the proppant 704. The continued pumping of the brine in the proppant slurry 702 after the expandable metal granules 114 are positioned at the zonal-isolation section 802 may displace the oil of the expandable metal slurry 108. The fluid spacer may assist in sequencing the different fluids.

In an example where the gravel-pack section 804 is a partial pack, the zonal-isolation section 802 may still be created. The expandable metal granules 114 may fill gaps in the partial pack. Further, the expandable metal granules 114 may help to push residual non-reactive proppant 704 together. Thus, if there are gaps in the proppant coverage of the gravel-pack section 804, the expandable metal granules 114 may help close the gaps, even at locations distant from the expandable metal granules 114 in the zonal-isolation section 802. While the gravel-pack configuration of FIG. 8 is particularly appealing in vertical and nearly vertical wellbores, the configuration may also be used in curved, angled, or substantially horizontal wells when taking alpha-beta wave structures that are encountered in horizontal gravel packing into consideration.

Figure 9:
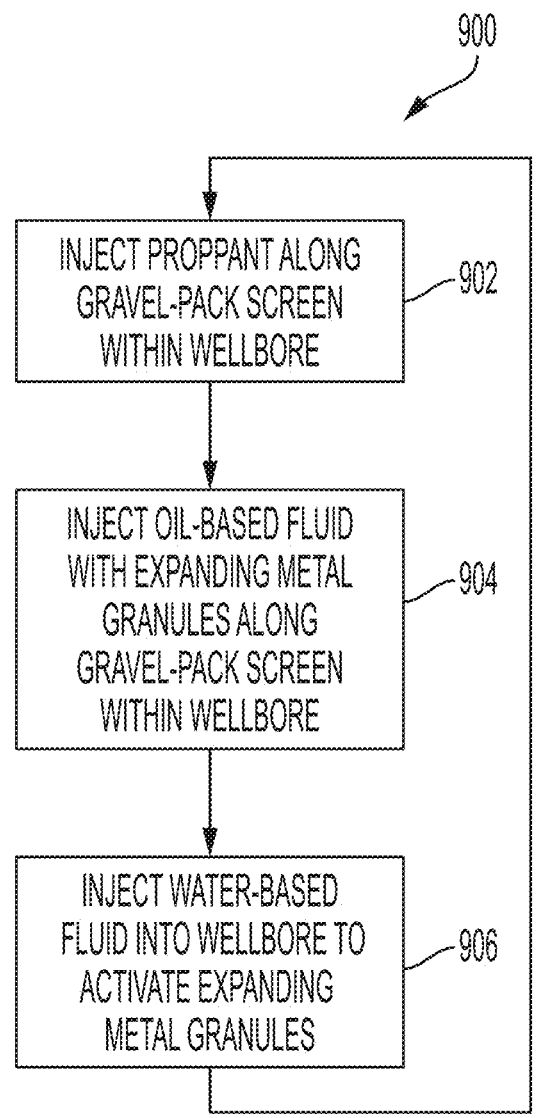
FIG. 9 is a flowchart of a process for performing the gravel-pack zonal isolation operation of FIG. 7 according to one example of the present disclosure.

FIG. 9 is a flowchart of a process 900 for performing the gravel-pack zonal isolation operation of FIGS. 6-8 according to one example of the present disclosure. At block 902, the process 900 involves injecting the proppant slurry 702 along the gravel-pack screen 602 within the wellbore 102. The proppant slurry 702 may include a water-based transmission fluid, such as a brine, and the proppant 704, such as sand.

At block 904, the process 900 involves injecting an oil-based fluid with the expandable metal granules 114 along the gravel-pack screen 602 within the wellbore 102. The expandable metal slurry 108 may include the oil-based fluid and the expandable metal granules 114. In some examples, the expandable metal granules 114 may be coated with the coating 402 described above with respect to FIG. 4. In such an example, the expandable metal slurry 108 may be an oil-based fluid or a water-based fluid because the coating 402 slows down the hydration reaction of the expandable metal granules 114.

In an example, a spacer fluid may be injected into the annulus 608 both prior to injecting the expandable metal slurry 108 and after injecting the expandable metal slurry 108. The spacer fluid may help position the proppant 704 deposited within the wellbore 102 around the gravel-pack screen 602 at block 902. Further, the spacer fluid may include a surfactant that prevents gelling of any oil in the expandable metal slurry 108.

At block 906, the process 900 involves injecting a water-based fluid into the wellbore 102 to activate the expandable metal granules 114. The water-based fluid may be a brine that reacts with the expandable metal granules 114 in a hydration reaction to generate a metal hydroxide. The metal hydroxide may form the zonal-isolation section 802 around the gravel-pack screen 602 between the sections 804 of the proppant 704.

In some examples, injecting the water-based fluid into the wellbore 102 may occur as part of injecting the proppant slurry 702 to form an uphole section of the proppant 704 from the zonal-isolation section 802. In such an example, block 906 may be bypassed, and the process 900 may return to block 902. That is, the water-based fluid may not be injected by itself without the proppant 704 in some examples.

Upon completion of the zonal-isolation section 804, the process 900 may return to block 902 for creation of an additional section 804 of the proppant 704. The sequencing of the proppant slurry 704 and the expandable metal slurry 108 may continue in the process 900 until a desired number of proppant and zonal-isolation sections are achieved.

In some aspects, a method, a mixture, or a material may be used for generating seals and isolation zones according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method, comprising: providing an expandable metal slurry downhole in a wellbore, the expandable metal slurry comprising granules of an expandable metal material suspended or dispersed in a fluid; and positioning the expandable metal slurry within the wellbore such that the granules of the expandable metal material in the expandable metal slurry are activatable to expand and form a seal within the wellbore.

Example 2 is the method of example 1, wherein providing the expandable metal slurry downhole in the wellbore comprises pumping the expandable metal slurry in an annulus between a wall of the wellbore and casing or within an inner-diameter of the casing.

Example 3 is the method of examples 1-2, wherein the seal comprises a shoe seal, a liner seal, a plug, a kickoff plug, a casing collar, a gravel-pack zonal isolation seal, or a casing anchor.

Example 4 is the method of examples 1-3, wherein the granules of the expandable metal material in the expandable metal slurry comprise a metal, or metal alloy comprising the metal, selected from the group consisting of magnesium, aluminum, zinc, and any combination thereof.

Example 5 is the method of examples 1-4, wherein the granules of the expandable metal material swell to form a seal between (i) a wall of the wellbore and (ii) a portion of casing or a portion of a gravel-pack screen.

Example 6 is the method of examples 1-5, wherein the granules of the expandable metal material have a surface area between 0.05 and 100 m2/kg.

Example 7 is the method of examples 1-6, further comprising: positioning a first layer of proppant within the wellbore surrounding a gravel-pack screen downhole from the expandable metal slurry; and positioning a second layer of proppant within the wellbore uphole from the first layer of proppant and the expandable metal slurry, wherein the seal within the wellbore generates zonal isolation between the first layer of proppant and the second layer of proppant.

Example 8 is an expandable metal slurry comprising: a fluid for performing a wellbore operation; and granules of a metal material suspended or dispersed in the fluid, the granules of the metal material being controllably activatable in a wellbore to expand to form a seal within the wellbore.

Example 9 is the expandable metal slurry of example 8, wherein each of the granules of the metal material comprise a coating layer that slows an activation process of the metal material.

Example 10 is the expandable metal slurry of example 9, wherein an expandable metal portion of the granules of the metal material comprise a surface area that is greater than 100 m2/kg.

Example 11 is the expandable metal slurry of examples 8-10, wherein the fluid for performing the wellbore operation is an oil-based fluid, and wherein the granules of the metal material are controllably activatable by subjecting the granules of the metal material to a water-based fluid.

Example 12 is the expandable metal slurry of examples 8-11, wherein the seal comprises a shoe seal, a liner seal, a plug, a kickoff plug, a casing collar, a gravel-pack zonal isolation seal, or a casing anchor.

Example 13 is the expandable metal slurry of examples 8-12, wherein the metal material comprises a metal, or metal alloy comprising the metal, selected from the group consisting of magnesium, aluminum, zinc, and any combination thereof.

Example 14 is the expandable metal slurry of examples 8-13, wherein the seal formed by the metal material comprises a metal hydroxide.

Example 15 is the expandable metal slurry of examples 8-14, further comprising: additive granules or fibers for increasing a packing density of the seal, wherein the additive granules or fibers comprise proppant, elastomers, plastics, ceramics, metals, or a combination thereof.

Example 16 is a material comprising: an expandable metal granule; and a layer coating the expandable metal granule, the layer positionable to slow a hydration reaction of the expandable metal granule.

Example 17 is the material of example 16, wherein the layer comprises a metal coating, a ceramic coating, a polymer coating, or an organic coating.

Example 18 is the material of examples 16-17, wherein the expandable metal granule comprises a surface area between 0.05 and 400 m2/kg.

Example 19 is the material of examples 16-18, wherein the expandable metal granule and the layer are suspendable or dispersable in a water-based fluid during injection into a wellbore.

Example 20 is the material of examples 16-19, wherein the expandable metal granule comprises a metal, or a metal alloy comprising the metal, selected from the group consisting of magnesium, aluminum, zinc, and any combination thereof.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method, comprising:
providing an expandable metal slurry downhole in a wellbore, the expandable metal slurry comprising granules of an expandable metal material suspended or dispersed in a fluid, wherein the granules of the expandable metal material comprise a specific surface area between 0.05 $m^2$/kg and 400 $m^2$/kg, wherein the expandable metal material comprises a metal, or metal alloy comprising the metal, selected from the group consisting of magnesium, aluminum, zinc, and any combination thereof; and
positioning the expandable metal slurry within the wellbore such that the granules of the expandable metal material in the expandable metal slurry are activated to expand and form a seal within the wellbore.

2. The method of claim 1, wherein providing the expandable metal slurry downhole in the wellbore comprises pumping the expandable metal slurry in an annulus between a wall of the wellbore and casing or within an inner-diameter of the casing.

3. The method of claim 1, wherein the seal comprises a shoe seal, a liner seal, a plug, a kickoff plug, a casing collar, a gravel-pack zonal isolation seal, or a casing anchor.

4. The method of claim 1, wherein the granules of the expandable metal material swell to form a seal between (i) a wall of the wellbore and (ii) a portion of casing or a portion of a gravel-pack screen.

5. An expandable metal slurry comprising:
a fluid for performing a wellbore operation; and
granules of a metal material suspended or dispersed in the fluid, the granules of the metal material being controllably activatable in a wellbore to expand to form a seal within the wellbore, wherein the granules of the metal material comprise a specific surface area between 0.05 $m^2$/kg and 400 $m^2$/kg, wherein the metal material comprises a metal, or metal alloy comprising the metal, selected from the group consisting of magnesium, aluminum, zinc, and any combination thereof.

6. The expandable metal slurry of claim 5, wherein each of the granules of the metal material comprise a coating layer that slows an activation process of the metal material.

7. The expandable metal slurry of claim 6, wherein an expandable metal portion of the granules of the metal material comprise a specific surface area between 0.05 $m^2$/kg and 100 $m^2$/kg.

8. The expandable metal slurry of claim 5, wherein the fluid for performing the wellbore operation is an oil-based fluid, and wherein the granules of the metal material are controllably activatable by subjecting the granules of the metal material to a water-based fluid.

9. The expandable metal slurry of claim 5, wherein the seal comprises a shoe seal, a liner seal, a plug, a kickoff plug, a casing collar, a gravel-pack zonal isolation seal, or a casing anchor.

10. The expandable metal slurry of claim 5, wherein the seal formed by the metal material comprises a metal hydroxide.

11. The expandable metal slurry of claim 5, further comprising:
additive granules or fibers for increasing a packing density of the seal, wherein the additive granules or fibers comprise proppant, elastomers, plastics, ceramics, metals, or a combination thereof.

12. The expandable metal slurry of claim 5, wherein the seal consists of the metal material.

13. A material comprising:
an expandable metal granule comprising a specific surface area between 0.05 $m^2$/kg and 400 $m^2$/kg; and
a layer coating the expandable metal granule, the layer positionable to slow a hydration reaction of the expandable metal granule to form a seal in a wellbore, wherein the expandable metal granule comprises a metal, or a metal alloy comprising the metal, selected from the group consisting of magnesium, aluminum, zinc, and any combination thereof.

14. The material of claim 13, wherein the layer comprises a metal coating, a ceramic coating, a polymer coating, or an organic coating.

15. The material of claim 13, wherein the expandable metal granule comprises a surface area between 0.05 m$^2$/kg and 100 m$^2$/kg.

16. The material of claim 13, wherein the expandable metal granule and the layer are suspendable or dispersable in a water-based fluid during injection into the wellbore.

17. The material of claim 13, wherein the seal consists of the expandable metal granule.

\* \* \* \* \*